Dec. 1, 1970   L. A. PLOUFFE ET AL   3,544,869
A.C. MOTOR STARTING CONTROL CIRCUIT UTILIZING TRIGGERABLE
SEMICONDUCTOR SWITCHING DEVICE WITH THERMISTOR
IN GATING CIRCUIT
Filed Dec. 30, 1968

Leo A. Plouffe
Lyle E. McBride, Jr.,
Inventors.

United States Patent Office

3,544,869
Patented Dec. 1, 1970

3,544,869
A.C. MOTOR STARTING CONTROL CIRCUIT UTILIZING TRIGGERABLE SEMICONDUCTOR SWITCHING DEVICE WITH THERMISTOR IN GATING CIRCUIT
Leo A. Plouffe, South Attleboro, and Lyle E. McBride, Jr., Norton, Mass., assignors to Texas Instruments Incorporated, Dallas, Tex., a corporation of Delaware
Filed Dec. 30, 1968, Ser. No. 787,449
Int. Cl. H02p 1/44
U.S. Cl. 318—221                               12 Claims

ABSTRACT OF THE DISCLOSURE

A control for an electrical motor having a main winding and an auxiliary winding. The control comprises a gate-triggerable semiconductor switching device connectable in series with the auxiliary winding across an A.C. power source. A thermistor is interconnected with the gate terminal for controlling the flow of triggering current. The thermistor reduces the triggering current below a predetermined triggering level for the device when heated to a predetermined threshold temperature. A heater is thermally coupled to the thermistor for heating thereof, and is connectable across the start winding for energization concurrently therewith. When the motor is energized, the heater thereby heats the thermistor which, after a predetermined delay to reach its threshold temperature, reduces the triggering current below the required triggering level thereby reducing the current in the auxiliary winding. The heater remains energized by the voltage across the auxiliary winding when the motor is operating so as to maintain the thermistor above its threshold temperature. Additional thermistor means, thermally coupled to the motor, and switching means provide overload protection.

---

This invention relates to a control for an electric motor and more particularly to such a control for deenergizing the auxiliary winding of a motor after a predetermined delay following energization of the motor.

It is common practice to provide electrical motors, particularly those for use in industry or in larger appliances, with both a main and an auxiliary winding. Thus the main winding is provided as a run winding and the auxiliary winding may be employed as a start winding. The split-phase motor is an illustration of a motor employing both a main and an auxiliary winding. In such a split-phase motor, the auxiliary winding is supplied with current which is out of phase with the main winding. In one type of split-phase motor, known as the capacitor start-capacitor run type, the auxiliary winding is connected in series with a large capacitance for starting purposes and with a smaller capacitance for running. In another type of split-phase motor, known as a capacitor start motor, the auxiliary winding is connected in series with a capacitor for starting purposes but is then completely deenergized after the motor has been started. In a third type of split-phase motor the phase shift between windings is obtained without the use of capacitors by using a high resistance auxiliary winding. In using each of these three types of motors, it is desired to reduce the current in the start winding (such as by disconnecting it from the power source) after a predetermined time following energization of the motor. Thus, where the auxiliary winding is used merely for starting purposes, it is desired to deenergize the start winding after the motor is started. With capacitor start motors, this is also the case. However, if the motor is so-called capacitor start-capacitor run, the current in the auxiliary winding will be reduced to a lower value rather than completely. In the use of these and various other types of motors, it is also frequently desired to provide thermal protection against overheating of the start winding or the main winding by protective deenergization of the motor. Overheating may occur either as a result of a locked rotor condition, or by less sudden motor overloading. For example, a gradual overload can cause continued heating over a long period of time eventually to raise the motor temperature above a safe level. In the latter case, it is desired to provide an ultimate trip function. Depending on the manner in which the motor is used, it may also be desired to provide either for automatic or manual reset of the motor start and protective deenergization mechanism after the motor has overheated and has been protectively deenergized by a trip mechanism. Heretofore, deenergization of the start winding after a predetermined time following energization of the motor and thermal protection for the motor components has usually been provided by mechanical switching, as by the use of bimetal thermostatic elements to control a switch or switch contacts. However, problems attendant with the use of mechanical thermostatic sensing have been the requirement and difficulty thereof of calibrating each motor control employing such mechanical switching; aging of the components causing a change in calibration; oxidation or erosion of the switch contacts resulting in ultimate failure thereof; proneness to interference from dirt or foreign material; and sensitivity to changes in supply voltage or ambient temperatures resulting in undesirable changes in starting and protective functions.

Accordingly, among the several objects of the invention may be noted the provision of an electric motor control employing a semiconductor current switching device for supplying current to the auxiliary winding of the motor upon energization thereof and for reducing the current after a predetermined delay following energization of the motor; the provision of such a control employing thermistor sensing of the temperature within the motor for deenergizing the main winding upon the heating of the motor; the provision of such a control employing thermistor sensing of the temperature of a winding of the motor for deenergizing the winding upon overheating thereof; the provision of such a control preventing a winding of the motor from being energized as long as the motor is overheated; the provision of such a control providing for starting and thermal protection of the motor without mechanical switching; the provision of such a control which is relatively insensitive to variations in supply voltage and ambient temperatures; and the provision of such a control which has long life and is relatively simple and inexpensive. Other objects and features will be in part apparent and in part pointed out hereinafter.

Briefly, the invention relates to a control for an electric motor having main and auxiliary windings for reducing the current in the auxiliary winding after a predetermined delay following energization of the motor. The control comprises a triggerable semiconductor current switching device which is connectable in series with the auxiliary winding across an A.C. power source. Conduction between the main terminals of the device is initiated by applying a triggering current to the gate terminal and is terminated when the triggering current is reduced below a predetermined triggering level. A thermistor is interconnected with the gate terminal of the device for controlling the flow of triggering current thereto. The thermistor reduces the triggering current below the predetermined triggering level when it is heated to a predetermined threshold temperature. A heater thermally coupled to the thermistor is connectable across the auxiliary winding so that it is energized to heat the thermistor concurrently with the energization of the auxiliary winding. Thus, the current switching device is triggered to supply current to the auxiliary winding upon energization of the motor and the heater thereby heats the thermistor. After a predetermined delay to reach the threshold temperature, the thermistor reduces the triggering current below the predetermined triggering level of the device and thereby reduces the current in the auxiliary winding. After this occurs, the heater remains energized by the voltage appearing across the auxiliary winding when the motor is operating thereby maintaining the thermistor above its threshold temperature. The invention also relates to a control for reducing the current in the main winding in the event of overload or overtemperature conditions in the form of additional thermistor means, thermally coupled to the motor, and switch means to provide overload protection as described below.

The invention accordingly comprises the constructions hereinafter described, the scope of the invention being indicated in the following claims.

In the accompanying drawings, in which several of the various possible embodiments of the invention are illustrated, FIG. 1 is a schematic circuit diagram of an electric motor control of this invention employing a triggerable semiconductor current switching device for controlling the energization of an auxiliary winding and a second such device for controlling the energization of a main winding of a motor in response to a temperature sensed in the motor by a thermistor;

Corresponding reference characters indicate corresponding parts throughout the several views of the drawings.

Figure 1:
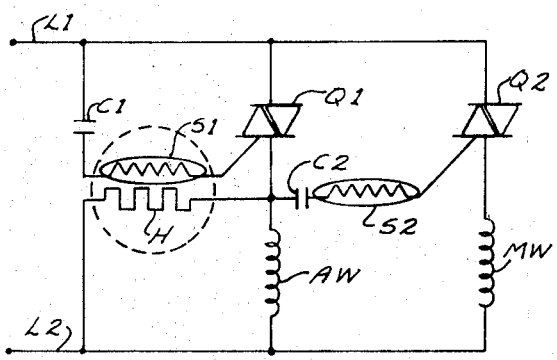

Referring now to FIG. 1, there is illustrated a control of this invention which is operative to reduce the current supplied to a start winding of a motor after a predetermined delay following energization of the motor. The main terminals of a triac Q1 are seen to be connected in series with the auxiliary winding AW of an electric motor across a pair of leads L1 and L2 which provide for connection of the control to a conventional A.C. power supply. As is known to those skilled in the art, triac Q1 is a member of the family of gate-triggerable semiconductor current switching devices. This family also includes a variety of similar devices such as, for example, the silicon controlled rectifier (SCR) and the silicon controlled switch (SCS).

Auxiliary winding AW, with which triac Q1 is connected, may be, for example, the start winding of a conventional single-phase motor. Conduction between the main terminals of triac Q1 is initiated by applying a triggering current to the gate terminal of the device and is terminated when the triggering current is reduced below a predetermined triggering level. A thermistor S1 is interconnected with the gate terminal of triac Q1 in series with a capacitor C1 which is, in turn, connected to supply lead L1. Thus thermistor S1 controls the flow of triggering current to triac Q1.

Thermally coupled to thermistor S1 is a heater H which is connected between one of the main terminals of triac Q1 and the other supply lead L2, i.e., it is connected across winding AW. Thermistor S1 is preferably of a material exhibiting a positive temperature coefficient (PTC) of resistivity and has a transition temperature above which the resistance thereof rises relatively abruptly. The dissipation and circuit characteristics of thermistor S1 (as well as thermistors S2–S4 referred to below) are such that the thermistor requires the addition of heat from an outside source for it to reach the transition temperature, i.e., the thermistor will not self-heat through joulean heating ($I^2R$) to the transition temperature without an additional thermal input. Heater H may also be a PTC thermistor in which case it would preferably also be of a similar material, i.e., one having a somewhat higher transition temperature above which temperature the resistance of the material thereof rises relatively abruptly. Such "sharp-break" thermistors, when employed in a self-heating mode, make ideal heaters for thermistors because of the ease in which the heater thermistor may be placed in thermally conductive relationship with the heated thermistor. Heater H may, of course, be a conventional resistive heater.

A second triac Q2 is provided for switching current to a main winding MW of the motor. The main terminals of triac Q2 and the main winding are connected in series across supply leads L1 and L2. A thermistor S2 is interconnected with the gate terminal of triac Q2 and is connected through a capacitor C2 to auxiliary winding AW. Thermistor S2 is thermally coupled to the motor, i.e., it is mounted so that it will sense the temperature in the motor. Thermistor S2 thereby controls the flow of triggering current to triac Q2. Triac Q2 is, like triac Q1, triggerable so that conduction between its main terminals is initiated by applying a triggering current to the gate terminal and is terminated when the triggering current is reduced below a predetermined triggering level. Thermistor S2 is a PTC type preferably having a transition temperature above which the resistance thereof rises relatively abruptly. The transition temperature of thermistor S2 is chosen to correspond with a maximum permissible temperature in the motor.

In the operation of the control of FIG. 1, it is first assumed that heater H is cool and that, accordingly, thermistor S1 is not heated. Thermistor S1 therefore exhibits a relatively low resistance. It is also assumed that the motor is relatively cool so that thermistor S2 also exhibits a relatively low resistance. Thus, when leads L1 and L2 are connected to a conventional A.C. power source triggering current is applied to the gate of triac Q1 through the circuit comprising capacitor C1 and thermistor S1. This causes triggering of triac Q1 so that it supplies current to winding AW for starting the motor. Since this causes a voltage to appear across winding AW, triggering current is supplied through capacitor C2 and thermistor S2 to the gate of triac Q2 to initiate conduction between the main terminals to triac Q2. The main winding MW is thereby energized. Since both the main winding MW and the start winding AW are now energized, the motor starts in normal fashion and is thereby brought up to running speed.

The voltage across winding AW also energizes heater H. therefore Heater H heats thermistor S1 to cause the temperature of thermistor S1 to rise. After a predetermined delay, thermistor S1 reaches a threshold temperature at which it reduces the triggering current applied to the base of triac Q1 below the predetermined triggering level for triac Q1 and triac Q1 therefore becomes nonconductive. Accordingly, start winding AW is deenergized. Since the motor is now operating at running speed, a voltage is induced in winding AW as a result of the "back" E.M.F. induced in the winding when the motor is operating normally. This voltage maintains heater H in its heated state and thereby causes thermistor S1 to be maintained above its threshold temperature. This voltage also is applied through capacitor C2 and thermistor S2 to the gate terminal of triac Q2, thereby maintaining conduction between the main terminals of triac Q2. Conduction between the main terminals of triac Q2 will be maintained even in the absence of voltage across winding AW because of the voltage existing across winding MW.

If the motor fails to start as a result of a locked rotor condition or if there is an overload condition while running, the motor will become overheated. Since thermistor S2 is mounted in the motor to sense the temperature thereof it will likewise be heated. If it is heated above a predetermined threshold temperature determined by the transition temperature, thermistor S2 will reduce the triggering current applied to the base of triac Q2 below the predetermined triggering level for the triac. Thus main winding MW will be deenergized upon overheating of the motor. Since, when the motor is deenergized, no voltage will be induced in start winding AW, heater H will cool down. Simultaneously, the motor cools down from it overheated condition. Accordingly, when heater H and therefore thermistor S1 have cooled, triggering current can once more be applied through capacitor C1 and thermistor S1 to the gate of triac Q1 causing reenergization of winding AW for restarting the motor. Simultaneously, the voltage appearing across winding AW when it is energized causes a triggering current to be applied to capacitor C2 and thermistor S2 to the gate of triac Q2 so as to reenergize winding MW. In this manner, the motor is not restarted until it is cooled from its high temperature overheated condition.

Figure 2:
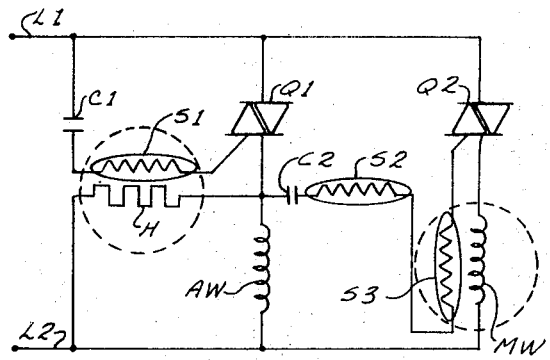
FIG. 2 is a schematic circuit diagram of a control similar to that shown in FIG. 1 including an additional thermistor for sensing the temperature in the main winding of the motor.

Referring now to FIG. 2, there is shown a motor control similar to that shown in FIG. 1 but which includes, in addition, a third thermistor S3 connected in series with capacitor C2 and thermistor S2 between the start winding AW and the gate terminal of triac Q2. Thus thermistor S3 also controls the flow of triggering current to triac Q2. As will be seen from FIG. 2, thermistor S3 is thermally coupled to the main winding MW of the motor. This thermal coupling may be accomplished, for example, by burying thermistor S3 in winding MW. The circuit therefore operates like that shown in FIG. 1, except that thermistor S3 provides thermal sensing to detect an overheating condition in main winding MW, and therefore provides additional thermal protection for the motor. Because thermistor S3 is thermally coupled to winding MW, it provides quicker repsonse to a locked rotor or overload condition.

Thermistor S3, like thermistors S1 and S2, is of PTC thermistor material preferably having a transition temperature above which the resistance thereof rises relatively abruptly. This is especially desirable where thermistors such as thermistors S2 and S3 are connected in series since it is desired that the resistance of the series combination of thermistors rise relatively substantially when any one of the thermistors is heated. Because a "sharp-break" thermistor of the type described has a temperature resistance anomaly, when heated to its transition temperature, its resistance increases relatively abruptly thereby providing a substantial increase in the resistance of the series combination of thermistors. Accordingly, thermistor S3 is chosen so that its transition temperature corresponds to a maximum permissible temperature in winding MW. Thus if winding MW is overheated to this maximum permissible temperature, thermistor S3 reduces the triggering current applied to the gate terminal of triac Q2 below the predetermined triggering level for the device and thereby deenergizes winding MW.

Figure 3:
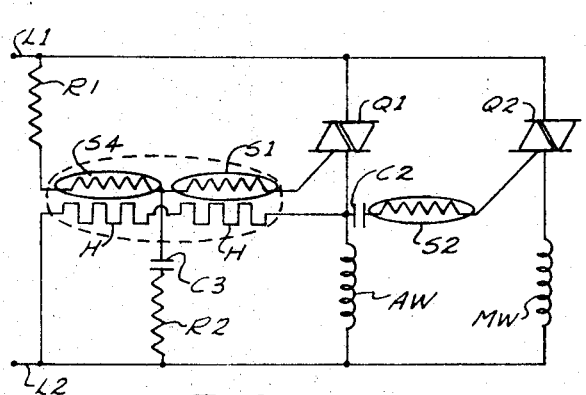
FIG. 3 is a schematic circuit diagram of a control similar to that shown in FIG. 1 including a thermistor for preventing the auxiliary winding from being energized as long as the motor is overheated.

FIG. 3 is a schematic circuit diagram of a modification of the circuit of FIG. 1 wherein a thermistor is employed as a high-temperature lock-out for preventing auxiliary winding AW from being energized as long as the motor is overheated. In this circuit an additional thermistor S4 is connected in series with thermistor S1 between the gate terminal of triac Q1 and supply lead L1 through a resistor R1. Heater H is thermally coupled to both thermistors S1 and S4. Thermistor S1, as in the circuits of FIGS. 1 and 2, functions to provide a predetermined time interval during which the start winding of the motor winding AW, is energized, triac Q1 becoming deenergized after a predetermined delay following energization of the motor as previously described. The circuit for applying triggering current to triac Q1 additionally comprises a resistor R2 and capacitor C3 serially connected between the junction of the two thermistors S1 and S4 and the other supply lead L2. Thermistor S4, which is thermally coupled to heater H, is also thermally coupled to the motor. That is, it is mounted for sensing the temperature in the motor, as by being located within the motor shell or case. It therefore functions to prevent the motor from being energized as long as the motor is overheated.

In the operation of this circuit, it is first assumed that the motor is relatively cool and that winding AW is deenergized and that heater H is also cool. Thus thermistors S1 and S4 are relatively cool and therefore exhibit a low resistance such that, upon connection of leads L1 and L2 to the A.C. power source, triggering current is applied through resistor R1 and thermistors S4 and S1 to the gate of triac Q1 thereby to initiate conducting between its main terminals. After the initial triggering current is applied in this manner, a triggering current for latching triac Q1 in its conductive state is supplied by the circuit comprising resistor R2, capacitor C3 and thermistor S1. Capacitor C3 provides triggering current to latch triac Q1 in its conductive state after conduction is first initiated by means of resistor R1 and thermistor S4. Since a voltage appears across winding AW when triac Q1 becomes conductive, heater H is energized by the voltage across winding AW thereby to heat thermistors S1 and S4. After a predetermined delay following energization of the motor (and therefore winding AW) thermistor S1 reduces the triggering current supplied to triac Q1 below the predetermined triggering level which is required to maintain triac Q1 in its conductive state. Thus, triac Q1 becomes nonconductive to deenergize widing AW. In the manner identical to that explained with regard to FIGS. 1 and 2, the heater remains energized by the voltage induced in winding AW when the motor is operating. Thermistor S1 is thus maintained above the threshold temperature.

If the motor should become overheated, thermistor S2 will reduce the triggering current supplied to triac Q2 in the manner previously explained, thereby to deenergize main winding MW. Since thermistor S4 is also thermally coupled to the motor it will be heated by the high temptrature of the overheaded motor. If this overheated condition of the motor causes thermistor S4 to be heated above a threshold level corresponding to a maximum permissible temperature in the motor, thermistor S4 will prevent triggering current from being applied through resistor R1 and the thermistors S4 and S1 to the gate of triac Q1. Thus winding AW is prevented from being reenergized as long as the motor is overheated. When the motor eventually cools from its overheated condition, thermistor S4 will also cool. Since, when the motor is not operating, no voltage appears across winding AW so that heater H is not energized, then triggering current for initiating conduction between the main terminals of triac Q1 can once more be supplied through resistor R1 and thermistors S4 and S1. In this way, start winding AW will once more be energized and the voltage appearing thereacross will energize heater H and will supply triggering current for triac Q2 through capacitor C2 and thermistor S2 to energize main winding MW. This embodiment also permits the control of start winding deenergization and reset independently by the use of two separate thermistors.

Figure 4:
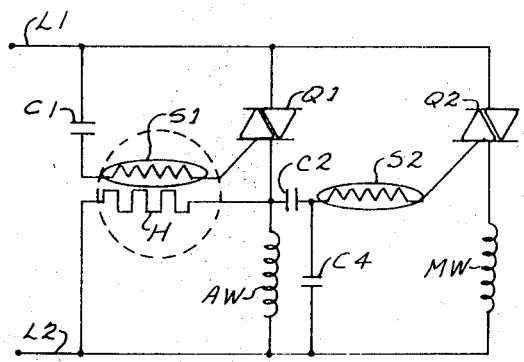
FIG. 4 is a schematic circuit diagram of a modification of the control of FIG. 1.

FIG. 4 illustrates a modification of the circuit of FIG. 1 which provides a motor control which is particularly well-suited for motors wherein a relatively low voltage appears across the auxiliary, or start, winding AW when the motor is operating. If this induced voltage is too low, insufficient triggering current may be provided to maintain triac Q2 in its conductive state for energizing main winding MW. Accordingly, a capacitor C4 is connected between the common connection of capacitor C2 and thermistor S2, and supply lead L2. Upon energization of the motor by connecting supply leads L1 and L2 to the A.C. power source, triac Q1 will be triggered in the manner previously explained. At this point in time, voltage is sufficiently great across winding AW to supply an initial triggering current to capacitor C2 and thermistor S2 to the gate of triac Q2. However, after the motor comes up to speed and winding AW is deenergized, the induced voltage may be low. However, capacitor C4 provides means for supplying the additional triggering current required to maintain triac Q2 in its conductive state as long as the motor operates properly.

Figure 5:
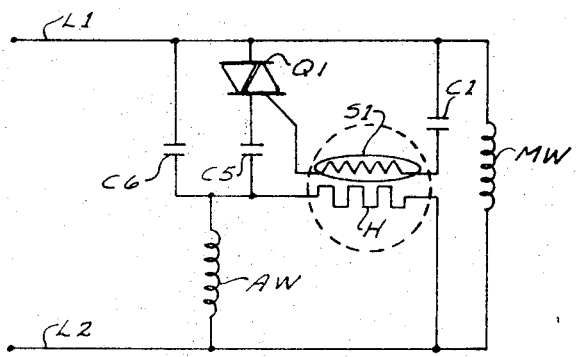
FIG. 5 is a schematic circuit diagram of a control of this invention particularly useful for controlling the starting of a split-phase motor.

FIG. 5 is the schematic circuit diagram of a control of this invention which is particularly useful for starting split-phase motors. As previously noted, split-phase motors may be of the type known as capacitor start or as capacitor start-capacitor run. FIG. 5 illustrates the application of a control of this invention for use with a motor of the latter type wherein a capacitor C5 is employed as a start capacitor and a capacitor C6 is employed as a run capacitor. If the motor were of the capacitor start type, i.e., the type of motor wherein the auxiliary winding AW is completely deenergized after the motor is started, then capacitor C6 would not be present. Start capacitor C5 is connected in series with a triac Q1 and the auxiliary winding AW of the motor across A.C. power supply leads L1 and L2. A circuit for applying triggering current to triac Q1 comprises, as in the circuits of FIGS. 1–4, a capacitor C1 and thermistor S1 connected in series between the gate terminal of triac Q1 and supply lead L1. Heater H is connected, also as in FIGS. 1–4, across the auxiliary winding AW.

It will thus be seen that, in operation, upon energization of the motor by connection of leads L1 and L2 to an A.C. power source, capacitor C6 is connected in series with the auxiliary winding AW to provide that winding with current which is out of phase with respect to the current through main winding MW. When supply leads L1 and L2 are connected to the A.C. power source, triggering current for triac Q1 is applied through capacitor C1 and thermistor S1. Conduction is thus initiated between the main terminals of triac Q1 thereby paralleling, in effect, capacitors C5 and C6 to provide a relatively large capacitance in series with auxiliary winding AW. Heater H is energized by the voltage appearing across auxiliary winding AW and thereby heats thermistor S1. After a predetermined delay to reach a predetermined threshold temperature, thermistor S1 reduces the triggering current supplied to triac Q1 below that level required to maintain the triac in its conductive state. Thus conduction between the main terminals of triac Q1 is terminated. Winding AW is therefore connected in series with capacitor C6 only. This therefore reduces the current applied to winding AW and the motor, accordingly, runs at normal speed.

If desired, such a split-phase motor as represented in FIG. 5 may be provided with thermal protection in the manner as shown in FIGS. 1 and 2 by providing another triac in series with main winding MW, the triac having a triggering circuit comprising a capacitor connected in series with a thermistor between the gate terminal thereof and the auxiliary winding AW, the thermistor being thermally coupled with the motor or one of its windings.

It is to be understood that heater H, as represented in each of FIGS. 1–5, may desirably comprise a PTC thermistor having a transition temperature above which the resistance thereof rises relatively abruptly, the thermistor used for this purpose thereby being employed in a self-heating mode. The use of such a thermistor for this purpose is advantageous because such a thermistor provides a heater with highly effective self-regulation since, as its temperature approaches a transition temperature, its resistance increases quickly to limit further heating. In other words, the thermistor is maintained essentially at its transition temperature. Such a heater is virtually unaffected by variations in ambient temperature and supply voltage. Of course, if desired, heater H may be a conventional resistive heater.

In view of the above, it will be seen that the several objects of the invention are achieved and other advantageous results attained.

As various changes could be made in the above constructions without departing from the gist of the invention, it is intended that all matter contained in the above description or shown in the accompanying drawings shall be interpreted as illustrative.

What is claimed is:

1. A control for an electric motor having a main winding and an auxiliary winding, for reducing the current in the auxiliary winding after a predetermined delay following energization of the motor, comprising:
   a triggerable semiconductor current switching device having main terminals and a gate terminal, the device being connectable in series with the auxiliary winding across an A.C. power source, conduction between the main terminals being initiated by applying a triggering current to the gate terminal and being terminated when the triggering current is reduced below a predetermined triggering level;
   a thermistor interconnected with said gate terminal for controlling the flow of triggering current thereto, the thermistor reducing said triggering current below said predetermined triggering level when the thermistor is heated to a predetermined threshold temperature; and
   a heater thermally coupled to said thermistor for heating the thermistor, the heater being connectable across the auxiliary winding for energization concurrently with the energization of the auxiliary winding, said current switching device being triggered to supply current to the auxiliary winding upon energization of the motor, the heater thereby heating the thermistor which, after a predetermined delay to reach said threshold temperature, reduces the triggering current below said predetermined triggering level thereby to reduce the current in the auxiliary winding, the heater remaining energized to maintain the thermistor above said threshold temperature by the voltage across the auxiliary winding when the motor is operating.

2. A motor control as set forth in claim 1 wherein said thermistor is a PTC thermistor having a transition temperature above which the resistance thereof rises relatively abruptly.

3. A motor control as set forth in claim 1 wherein said heater is a PTC thermistor having a transition temperature above which the resistance thereof rises relatively abruptly.

4. A motor control as set forth in claim 1 further comprising:
   a second triggerable semiconductor current switching device having main terminals and a gate terminal, the device being connectable in series with the main winding across said A.C. power source, conduction between the main terminals being initiated by applying a triggering current to the gate terminal and being terminated when the triggering current is reduced below a predetermined triggering level; and
   a second thermistor, said thermistor being mounted for sensing the temperature in said motor and being interconnected with the gate terminal of said second current switching device and connectable to said auxiliary winding for controlling the flow of triggering current to said device, said thermistor reducing said triggering current below said predetermined triggering level when heated above a predetermined threshold corresponding to a maximum permissible temperature in said motor, said device thereby being triggered by voltage appearing across the auxiliary winding and main winding but conduction between the main terminals of said device being terminated to deenergize said main winding upon overheating of the motor.

5. A motor control as set forth in claim 4 further comprising a third thermistor, said thermistor being connected in series with said second thermistor for also controlling the flow of triggering current to said second device, said third thermistor being thermally coupled to said main winding and being operable to reduce said triggering current below said predetermined trigger level when heated above a predetermined threshold corresponding to a maximum permissible temperature of said winding thereby to deenergize said winding upon overheating thereof.

6. A motor control as set forth in claim 5 wherein each of said second and third thermistors is a PTC thermistor having a transition temperature above which the resistance thereof rises relatively abruptly.

7. A motor control as set forth in claim 4 further comprising a capacitor connected between the first-said thermistor and one side of the A.C. power source for supplying triggering current to the first-said current switching device, and a second capacitor through which said second thermistor is connectable to said auxiliary winding for supplying triggering current to the first-said second current switching device.

8. A motor control as set forth in claim 7 further comprising a third capacitor connected between one side of the A.C. power source and the common connection of said second thermistor and said second capacitor for providing additional triggering current to said second current switching device.

9. A motor control as set forth in claim 4 wherein each of said current switching devices is a triac.

10. A motor control as set forth in claim 1 further comprising a second thermistor to which said heater is thermally coupled, said thermistor being connected in series with the first-said thermistor for also controlling the flow of triggering current to said current switching device, and being mounted for sensing the temperature in said motor, said second thermistor preventing said triggering current from reaching said predetermined triggering level when heated to a threshold level corresponding to a maximum permissible temperature of the motor, whereby said auxiliary winding is prevented from being reenergized as long as the motor is overheated.

11. A motor control as set forth in claim 10 further comprising means for supplying triggering current for said current switching device constituted by a resistance through which said second thermistor is connected to one side of the A.C. power source, and a capacitor and a resistance connected in series between the common connection of said thermistors and the other side of the A.C. power source.

12. A motor control as set forth in claim 1 wherein said current switching device is connectable to said auxiliary winding in series with a start capacitor.

References Cited

UNITED STATES PATENTS

| | | | |
|---|---|---|---|
| 3,303,402 | 2/1967 | Martin | 318—221 |
| 3,399,333 | 8/1968 | Canter | 318—227 |
| 3,403,315 | 9/1968 | Maynard | 318—227 |
| 3,414,789 | 12/1968 | Prouty | 318—221 |

FOREIGN PATENTS 1,042,126   9/1966   Great Britain.

ORIS L. RADER, Primary Examiner

G. Z. RUBINSON, Assistant Examiner

U.S. Cl. X.R.

318—227, 229